United States Patent
Swanson et al.

(10) Patent No.: US 8,407,516 B2
(45) Date of Patent: Mar. 26, 2013

(54) CONTROLLING MEMORY REDUNDANCY IN A SYSTEM

(75) Inventors: Robert C. Swanson, Olympia, WA (US); Mahesh S. Natu, Sunnyvale, CA (US); Rahul Khanna, Portland, OR (US); Murugasamy K. Nachimuthu, Beaverton, OR (US); Sarathy Jayakumar, Portland, OR (US); Anil S. Keshavamurthy, Portland, OR (US); Narayan Ranganathan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 12/645,778

(22) Filed: Dec. 23, 2009

(65) Prior Publication Data

US 2011/0154104 A1    Jun. 23, 2011

(51) Int. Cl.
*G06F 11/00* (2006.01)

(52) U.S. Cl. .................................................. 714/6.23

(58) Field of Classification Search .............. 714/6.23, 714/6.11, 6.2
See application file for complete search history.

(56) References Cited

U.S. PATENT DOCUMENTS

| | | | |
|---|---|---|---|
| 5,295,258 A | | 3/1994 | Jewett et al. |
| 5,974,506 A * | | 10/1999 | Sicola et al. .................. 711/120 |
| 6,151,665 A * | | 11/2000 | Blumenau ..................... 711/162 |
| 6,170,037 B1 * | | 1/2001 | Blumenau ..................... 711/114 |
| 6,295,591 B1 * | | 9/2001 | Bealkowski et al. .......... 711/165 |
| 6,633,955 B1 * | | 10/2003 | Yin et al. ........................ 711/114 |
| 6,820,182 B1 * | | 11/2004 | Bauman et al. ................ 711/170 |
| 7,062,628 B2 * | | 6/2006 | Amano ........................... 711/170 |
| 7,281,104 B1 | | 10/2007 | Tsypliaev et al. |
| 7,693,880 B1 * | | 4/2010 | Ranade .................. 707/999.203 |
| 2003/0101318 A1 * | | 5/2003 | Kaga et al. ..................... 711/114 |
| 2004/0205384 A1 | | 10/2004 | Lai et al. |
| 2007/0079170 A1 * | | 4/2007 | Zimmer et al. .................... 714/6 |
| 2009/0006048 A1 | | 1/2009 | Wang et al. |
| 2009/0006837 A1 | | 1/2009 | Rothman et al. |
| 2009/0164742 A1 * | | 6/2009 | Wach et al. .................... 711/162 |
| 2009/0164837 A1 | | 6/2009 | Swanson et al. |
| 2009/0172323 A1 * | | 7/2009 | Swanson et al. .............. 711/162 |
| 2011/0154103 A1 * | | 6/2011 | Bulusu et al. ................. 714/6.23 |

FOREIGN PATENT DOCUMENTS

EP    1 555 604 A2    7/2005

OTHER PUBLICATIONS

U.S. Appl. No. 12/643,345, filed Dec. 21, 2009, entitled "Performing Redundant Memory Hopping," by Mallik Bulusu, et al.

European Patent Office, Search Report mailed Sep. 6, 2012 in European application No. 10252161.4-2224 / 2348413.

* cited by examiner

*Primary Examiner* — Joshua Lohn

(74) *Attorney, Agent, or Firm* — Trop, Pruner & Hu, P.C.

(57) ABSTRACT

In one embodiment, the present invention provides an ability to handle an error occurring during a memory migration operation in a high availability system. In addition, a method can be used to dynamically remap a memory page stored in a non-mirrored memory region of memory to a mirrored memory region. This dynamic remapping may be responsive to a determination that the memory page has been accessed more than a threshold number of times, indicating a criticality of information on the page. Other embodiments are described and claimed.

21 Claims, 7 Drawing Sheets

400

CONTROLLING MEMORY REDUNDANCY IN A SYSTEM

BACKGROUND

In today's world of ubiquitous servers, maintaining good server reliability and uptime is almost mandatory. To maintain significant system uptime, system designers build reliability, availability, serviceability, manageability (RASM) features to improve overall system reliability and availability. Thus, it is common to find various degrees of redundancy, error correction, error detection and error containment techniques employed at different levels in the system hierarchy. One of the most common types of system failure is attributed to system memory errors. Hence, the memory subsystem (especially dual in-line memory modules (DIMMs)) receives particular attention in this regard.

Though modern memory employs error correction code (ECC) to detect and/or correct single and double-bit errors, higher order multi-bit errors still pose a significant problem for system reliability and availability. Thus techniques like memory mirroring and memory migration are used to reduce the likelihood of system failure due to memory errors. Mirroring is typically performed statically by system hardware and firmware, which provides full redundancy for the entire memory range in a manner largely transparent to an underlying operating system/virtual machine monitor (OS/VMM). However, it is not very cost-effective and therefore tends to be deployed only on very high-end and mission-critical systems. This is so, since the effective usable memory is reduced to about half while power consumption for the same amount of usable memory is effectively doubled. Also, with the cost of memory being a significant percentage of overall hardware cost, doubling it for redundancy purposes alone poses practical challenges for wide adoption.

On a mission critical server, the system should never be shut down or experience a loss in operational state so that the server can achieve a performance uptime of 99.999%. Memory migration is another platform RAS flow that is triggered on a memory mirror replace or during controller-level memory sparing operations. For a memory mirror replacement, suppose that a memory node X and a memory node Y are set as a mirror pair in that both nodes store the same data, e.g., with X as the master and Y as the slave. For various reasons, system software can stop the mirroring, power down the master and let an administrator replace the master's memory node. Once replaced, the memory contents of the master and slave can be re-synchronized. This process is done via a memory migration (in which information stored on node Y is copied to node X). In controller-level memory sparing, a spare memory node that is in a non-mirrored configuration can also be present in the system. This spare node can be "spared" into another node if the other node fails. In this case, the contents of the outgoing memory node are copied over to the spare node via memory migration.

In memory mirroring mode, memory read requests go to the master and memory write requests are directed to both the master and the slave. If there is an uncorrectable error on the master, then the slave will fulfill the request. Basically, the slave has the exact copy of data and provides the redundancy. In the case of migration, all read requests are directed to the master and write requests are directed to both the master and the slave, similar to mirroring. But if there is an uncorrectable error on the master during the migration process, then the slave will not fill that read request as the slave does not have the data available, resulting in a fatal error and taking down the system. For a large memory configuration, the memory migration can and does take a significant amount of time. There is a reasonable probability that the master, that has already experienced certain correctable errors causing the migration event, will see an uncorrectable error, and in migration mode, such uncorrectable error will cause the system to crash.

DETAILED DESCRIPTION

In various embodiments during migration operations, supervisor software (e.g., basic input output system (BIOS)) can interact with system hardware to enable a slave memory node to handle access requests during the course of memory migration if a master node should suffer an uncorrectable error while in migration mode. During memory migration BIOS can read a cache line (filled by the master) and write it back (to master and the slave). In this way, the contents of the master can be eventually copied over to the slave, cache line-by-cache line. This is called a write-on-write (WOW) copy. Note that a write on read (WOR) is handled in a similar manner, but the hardware itself does the writes after BIOS reads a cache line. During migration, because the supervisor software started copying the memory over, it can disambiguate the memory range that has already been copied (and is now redundant) versus the range that has yet to be copied (and is thus still susceptible to errors). If an uncorrectable memory error occurs to the master node within the already copied range, the error can be corrected and the system can continue operation.

Embodiments provide a mechanism by which supervisor software can provide information to a master memory controller regarding how much content has been copied over to the slave. If any uncorrectable error occurs and falls within the already-copied range, the controller can treat it as if a mirror configuration is present (which it is for this purpose) and have the slave fill the request (as in the case of mirroring). In this way, the system can treat this situation as a correctable error and continue operation.

In various embodiments, BIOS or other supervisor software that does the WOW (or WOR) copy can update a register in the master memory controller as to the range that is already copied over to the slave. In some implementations, for protection this register is writeable only from within a system management mode (SMM). During a memory migration operation, the memory controller can use this information present in the register to determine if the slave is capable of filling the request if the master suffers an uncorrectable error. If so, then the memory controller requests the slave to fill this request. In other words, the range which has been copied over will act as a mirror pair (with redundancy) and the range which has not been copied over will act in migration mode and is still susceptible to fatal errors until more memory is migrated via the WOW or WOR copy engines.

Figure 1:
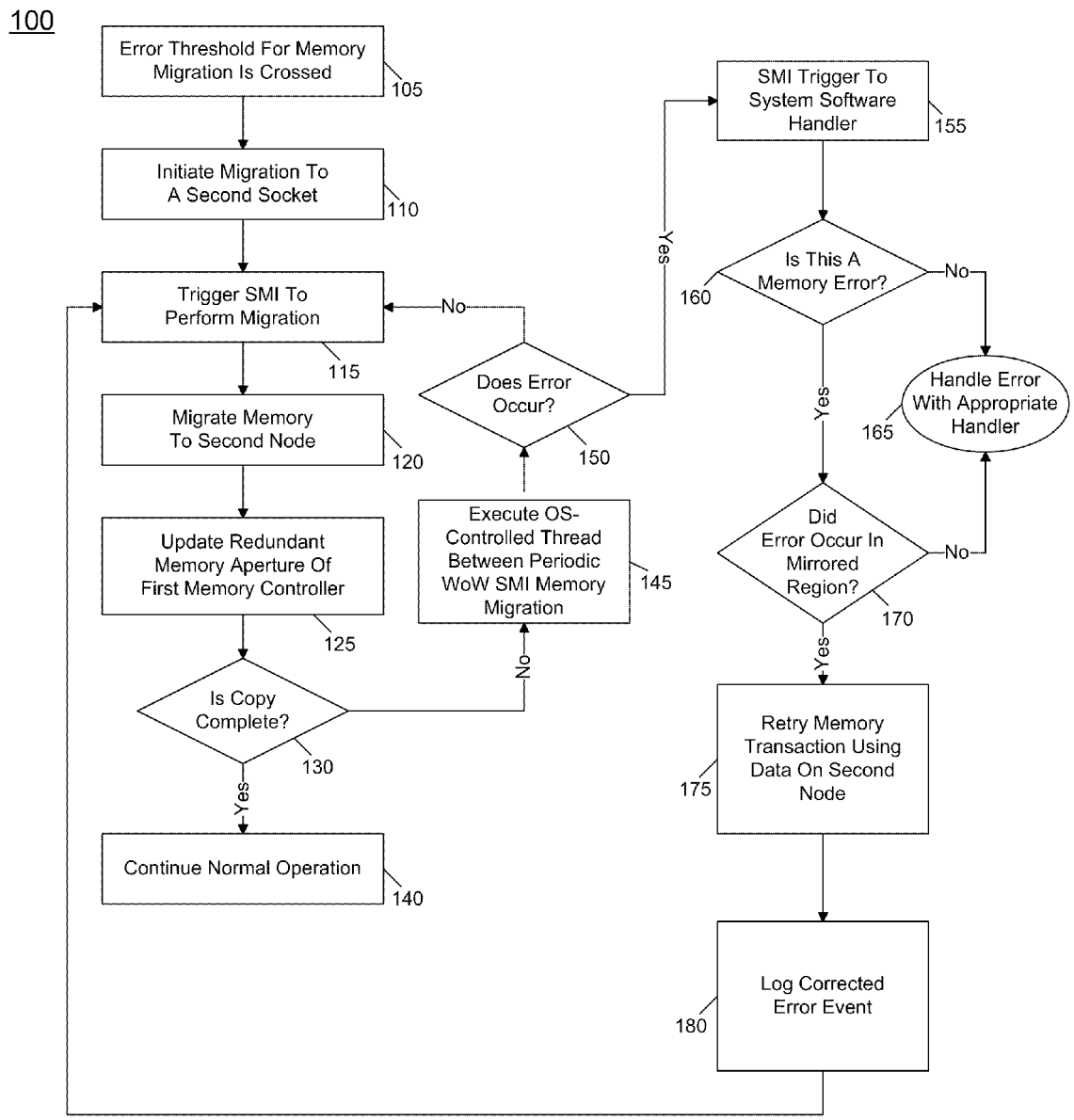
FIG. 1 is a flow diagram of a method in accordance with an embodiment of the present invention.

Referring now to FIG. 1, shown is a flow diagram of a method in accordance with an embodiment of the present invention. As shown in FIG. 1, method 100 may be implemented using a variety of software executed at both the system level and further using hardware, e.g., of a memory controller, to enable handling faulty memory requests during a memory migration operation. As seen in FIG. 1, method 100 may begin when an error threshold is crossed (block 105). For example, BIOS may have a threshold set over which a memory migration should be effected. For example, the threshold may be a number of correctable errors that occur on a given socket. When this threshold is crossed, this indicates that a loss of redundancy in a memory mirroring system may occur and thus a memory migration should occur. Accordingly, at block 110 a migration from a socket of a system (which may include a spare memory node) on which the threshold was crossed (i.e., a first socket) to a second socket may be initiated. In one embodiment, BIOS may initiate this migration. Accordingly, an interrupt, e.g., a system management interrupt (SMI), may be generated to begin the migration (block 115).

In one embodiment, the migration operation may occur in a time-sliced SMI fashion. That is, as it may take a relatively long amount of time (e.g., an hour or more) to perform the migration, the migration may be performed in a time slice manner to enable useful work also to be performed. Thus control passes from block 115 to block 120, where the migration of data to a spare node may occur. At the end of a given time slice (which may be on the order of approximately 32 milliseconds (ms), in one embodiment), control passes to block 125 where an update of information on the memory controller associated with the first socket may occur. More specifically, a redundant memory aperture may be set, e.g., in one or more registers (generally referred to as a redundant memory aperture register) to indicate the amount of redundant data that has been successfully migrated so that it may be accessed if needed. Control then passes to diamond 130 where it may be determined whether the copy is complete. If so, control passes to block 140 where the system may continue normal operation.

If instead at the conclusion of a time slice the migration is not complete, control passes to block 145 where the OS may perform various useful work in other time slices of the system. During such execution of an OS-controlled thread in this time slice it may be determined whether an error occurs (diamond 150). If not, at the conclusion of the given time slice, an SMI may be triggered to continue the migration at block 115 as discussed above.

Otherwise if an error does occur, control may pass to system software, e.g., an SMI handler that is triggered responsive to an SMI interrupt (block 155). In one embodiment, an early BIOS handler may disambiguate this SMI versus other SMIs. If it is determined that the SMI does not regard a memory error (diamond 160), control may pass to block 165 where the error may be handled with an appropriate handler. If instead it is determined that the error is a memory error, control may pass to diamond 170 where it may be determined whether the error occurred in the mirrored region. This determination may be based on an address associated with the memory request that is in error and analysis of the redundant memory aperture register of the first socket's memory controller.

If this error did indeed occur in a mirrored region, namely a region that has already been copied over to the second node, control passes to block 175 where the memory controller can retry the memory transaction using data on the second node. Accordingly, the first memory controller can forward the memory transaction to a second memory controller associated with the second node, to access the requested data in the already-mirrored portion. This second memory controller may thus retrieve the data and send it back to the memory controller of the first socket, which can in turn forward the requested data to the register to thus complete the transaction. In this way, errors occurring during a memory migration may be corrected such that there is not a need to reset the system for an uncorrectable error occurring during the memory migration. If this error is thus corrected, a corrected error event may be logged for the memory request (block 180). In one embodiment, BIOS may log such error, e.g., by assertion of a machine check. Otherwise at diamond 170 if the error does not occur in a region that has been copied over, the error may persist and control passes to block 165 for handling the error as appropriate. For example, at block 165 the error may be handled in a conventional manner in which a machine check is signaled to the OS, which may begin a crash dump of the system. While shown with this particular implementation in the embodiment of FIG. 1, the scope of the present invention is not limited in this regard.

Figure 2:
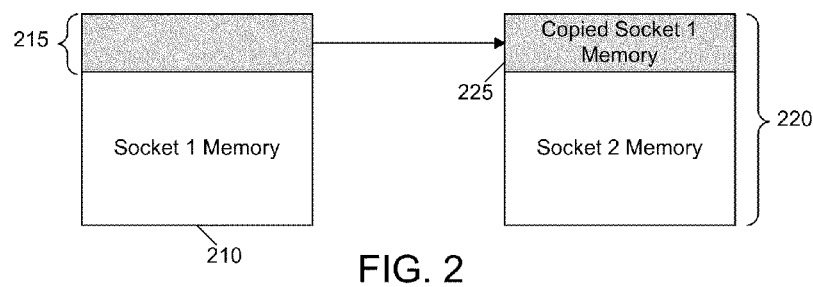
FIG. 2 is a block diagram of memories associated with two sockets in accordance with one embodiment of the present invention.

Referring now to FIG. 2, shown is a block diagram of memories associated with two different sockets, namely a first socket and a second socket. As seen, a first socket memory 210 may be in the process of being migrated to a second socket memory 220. Due to the likely interrupted nature of the memory migration and the long time period in which the migration occurs, at a given time instant only a portion of the migration may be complete. Thus as shown in FIG. 2, a first portion 215 of the first socket memory 210 has been successfully copied over to a portion 225 of the second socket memory 220. Thus until additional memory is copied over, only if an error occurs in the first region 215 of the first memory 210 can the second memory 220 provide the data to resolve an access error occurring on first memory 210.

Figure 3:
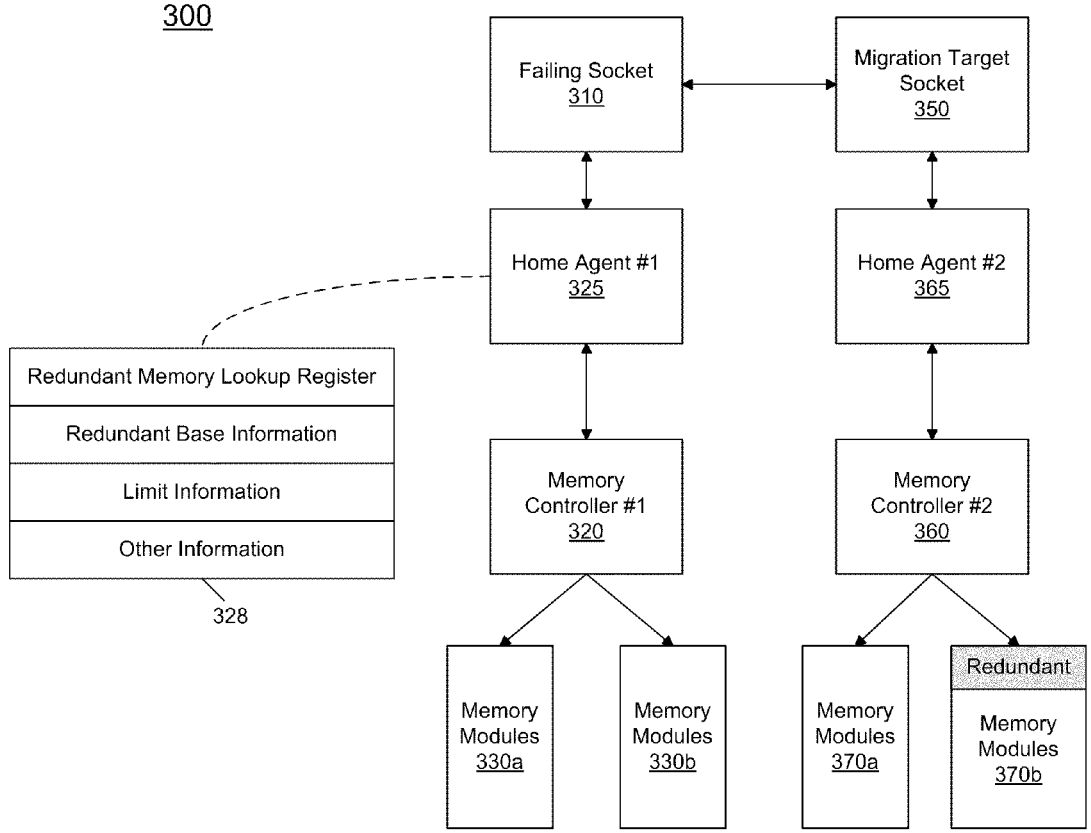
FIG. 3 is a block diagram of communication between sockets in accordance with an embodiment of the present invention.

Referring now to FIG. 3, shown is a block diagram of communication between sockets in accordance with an embodiment of the present invention. As shown in FIG. 3, a first socket 310 may be a socket including a failing memory. Specifically, first socket 310 includes a first memory controller 320, which may include or be associated with a home agent 325 that in turn may include a storage area 328 in accordance with an embodiment of the present invention. Home agent 325 may, in some embodiments, be a front end of the memory controller. In one embodiment, storage area 328 may be a redundant memory aperture register that includes various information indicating the amount of successfully migrated data between first system 310 and a second system 350. As seen, memory controller 320 may control accesses to various memory modules, including modules $330_a$ and $330_b$. Similar hardware may be present in second socket 350, including a second memory controller 360, which may include or be associated with a second home agent 365, and memory controller 360 may also be in communication with various memory modules, e.g., modules $370_a$ and $370_b$. As seen, a portion of module $370_b$ may include redundant data, e.g., migrated over from memory module $330_b$. Thus during the course of migration if an access error occurs in this portion of memory $330_a$ already copied over, the data may be obtained from second socket 350 through memory controller 360 from the redundant portion of memory $370_b$. Otherwise, an uncorrectable error may occur.

Embodiments may further control memory mirroring by utilizing OS knowledge of information associated with page allocation, remap and use. Memory errors typically occur during memory read/write cycles, and a soft error rate (SER) increases with memory speed and intensity of use. For example, memory cycling at 100 nanoseconds can generate soft error rates 100 times that of memory idling in refresh mode. In other words, intensity of memory use can increase the chances of soft errors. Also, from an OS/VMM point of view, at any given time there is a very small subset of active pages (referred to as hot pages) that are read/written intensively, with the remainder being largely inactive (referred to as cold pages). Furthermore the OS/VMM controls the mapping of application/guest address space (i.e., virtual address) to real system memory address space (i.e., physical address). Embodiments may provide OS/VMM support to use the above facts to improve overall system availability by tracking and dynamically remapping the frequently used pages, i.e., hot pages, into mirrored regions of memory.

In many implementations, rather than full memory mirroring, a partial platform memory mirroring scheme may be used to increase the available usage of total platform memory. Thus for purposes of discussion, assume that at least some but not all regions of system memory can be configured to have memory mirroring enabled. For example, mirroring may be limited to a single channel on a multi-socket system. When mirrored memory is only sparsely available, it needs to be used efficiently in order to have better system availability. The system can with OS/VMM help selectively mirror the memory regions corresponding to critical components of the software stack. System firmware can configure the platform to redundantly direct all accesses to mirrored memory regions to both the master and slave (e.g., mirrored) memory. To the software stack, these mirrored memory accesses are no different from accesses to non-mirrored regions of memory. The system will transparently failover to the mirrored memory (slave) in case of memory errors on the master.

The platform can provide the OS/VMM a priori knowledge about the availability of mirrored memory regions e.g., via a static Advanced Configuration and Power Interface (ACPI) table. The OS/VMM can parse this table at boot time and in consultation with a table or similar mechanism of a memory controller, construct physical address ranges available for its use within this mirrored region. In addition, other tables may provide information about the memory ranges that are mirrored and non-mirrored. Such table may provide memory address ranges that are usable and reserved from an OS perspective. In one embodiment, these tables may be present in the BIOS and provided to the OS at boot time via an ACPI interface. Note that although the OS/VMM is aware of which portions of the system address space correspond to mirrored memory, OS/VMM intervention is not required for the platform/hardware to perform the actual mirroring operation.

During operation, the OS/VMM may maintain statistics of kernel and application/guest page accesses for various reasons. For example, on a non-uniform memory architecture (NUMA) system, the OS/VMM can use page statistics information to move pages closer to the memory node being accessed. Similarly, the OS/VMM can use page statistics and consolidate active physical memory to a subset of DIMMs and retain inactive DIMMs in self refresh modes to achieve better overall power savings. Embodiments may similarly categorize pages as being hot (e.g., pages that are more intensively accessed) or cold (e.g., pages that are less intensively accessed) by defining high and low threshold values. In one embodiment, the OS/VMM determines the threshold in proportion to the amount of mirrored to non-mirrored memory availability. For example, if x % of the system memory is mirrored memory then the OS/VMM can dynamically map pages with up to top x % of all page access counts to the mirrored region. Once the frequency of accesses to a page (either read or write) reaches the high threshold, that page is marked as being a hot page. Similarly, when the frequency of accesses drops below the low threshold, the page is marked as a cold page. The OS/VMM can then track page transitions from hot-to-cold and vice-versa, in one or more migrate lists, e.g., migrate-to-cold and migrate-to-hot lists respectively. In different implementations, these lists can be implemented as either a separate list or part of the page tables.

In some embodiments, a mirror-aware page remapper (and a migration analyzer, described below) may be executed as a software thread within the OS/VMM. It can run in the background, scanning the migrate-to-hot and migrate-to-cold lists and remap pages such that the hot pages reside in the mirrored areas of memory and cold pages reside in non-mirrored areas of memory. In one embodiment, the remapper may first scan the migrate-to-hot list, which contains pages that reside in a non-mirrored region but having an access frequency that has hit the high threshold mark. This remapper operates to remap pages present in the migrate-to-hot list to a mirrored region of memory. If there is not enough room for these "newly" hot pages, it will scan the migrate-to-cold list, which contains pages that reside in a mirrored region and whose access frequency has fallen below the low threshold mark, and attempt to make space available in the mirrored region by remapping these pages from the mirrored region to some non-mirrored area of memory. Once the pages in the migrate-to-hot list are successfully located in mirrored memory, subsequent accesses to these hot pages will be transparently mirrored by the platform. In this way, the availability of the more frequently accessed pages (and therefore more error-prone pages) is effectively increased, thus improving system availability and making the system more resilient to memory errors.

Embodiments thus may use an OS/VMM mirrored-memory-region-aware dynamic page-remap technique to locate active (hot) pages in mirrored memory regions, which may provide better system availability by keeping actively used pages on mirrored memory regions. Also, since inactive memory pages reside on non-mirrored memory regions, the memory access bandwidth to those regions will be lower, allowing them to go to a lower power state. This will lead to better memory power management overall and also reduce the likelihood of memory errors (soft errors) on non-mirrored memory regions.

Figure 4:
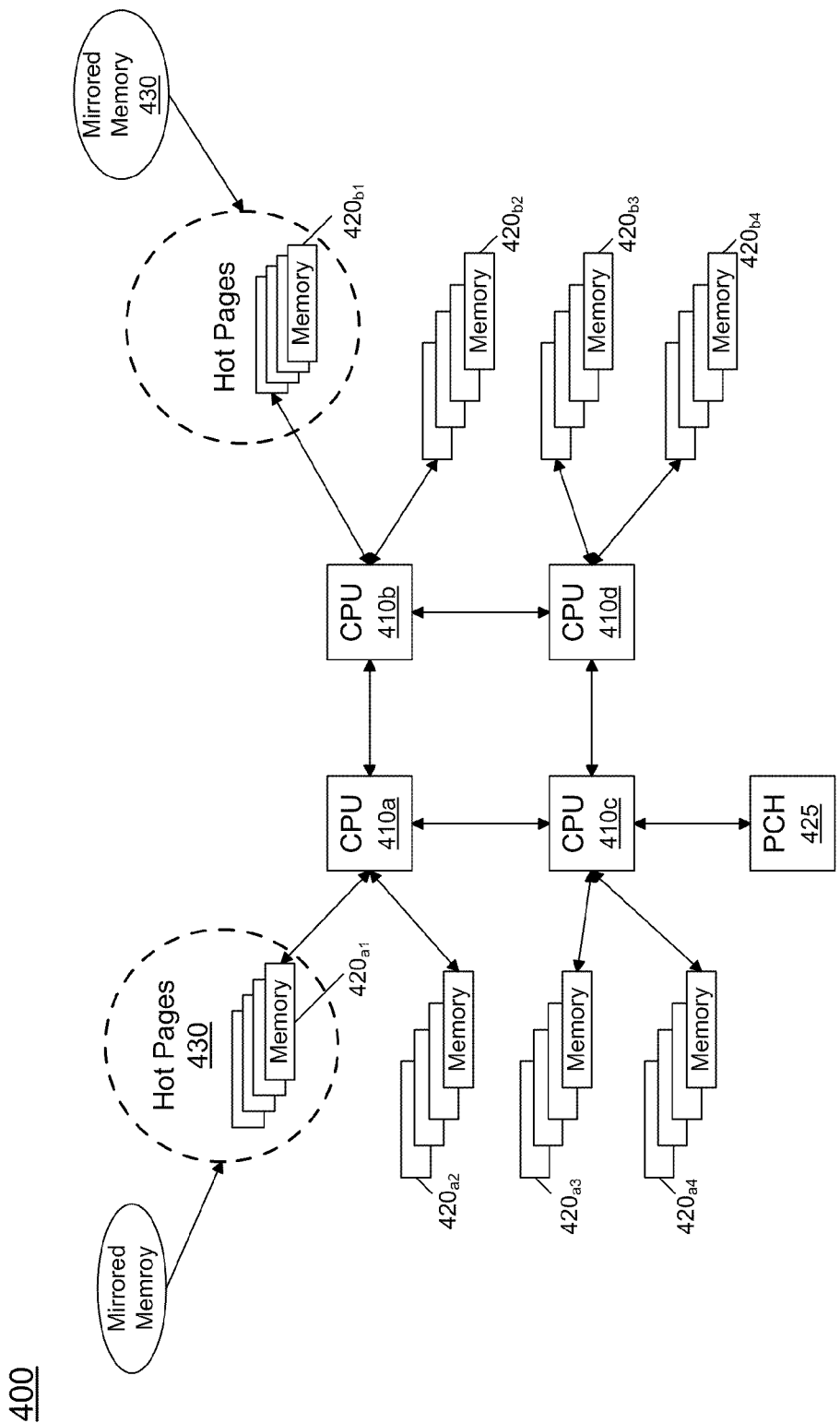
FIG. 4 is a block diagram of a system in accordance with one embodiment of the present invention.

Referring now to FIG. 4, shown is a block diagram of a system in accordance with one embodiment of the present invention. As shown in FIG. 4, system 400 may be a high-availability server including a plurality of processors $410_a$-$410_d$. In one embodiment, each processor may be a multicore processor and may further include additional components such as integrated memory controllers, peripheral controllers and so forth. As seen, each processor is coupled to a local portion of a system memory. For example, processor $410_a$ is coupled to local memories $420_{a1}$ and $420_{a2}$, which may be memory modules formed of DIMMs. In turn, processor $410_c$ may be coupled to local memories $420_{a3}$ and $420_{a4}$. Similarly, processor $410_b$ may be coupled to local memories $420_{b1-b2}$ and processor $410_d$ coupled to local processors $420_{b3-b4}$. As seen, the processors may be coupled via point-to-point (PtP) interconnects.

In the embodiment of FIG. 4, instead of having a fully mirrored memory system which can reduce the available amount of true memory capacity while raising complexity and power consumption, a partially-mirrored scheme is present. Thus as seen, local memories $420_{a1}$ and $420_{b1}$ may be mirrored, while none of the other memories include redundant data. According to embodiments described herein, data that is associated with more frequently accessed data can be stored in hot pages 430, which may be stored in memory module $420_{a1}$ and mirrored in memory module $420_{b1}$. As further seen in FIG. 4, a peripheral controller hub 425 may be coupled to processor $410_c$ and which in turn may be coupled to various peripheral devices such as input/output (IO) devices, mass storage and so forth. While shown with this particular implementation in the embodiment of FIG. 4, the scope of the present invention is not limited in this regard.

Figure 5:
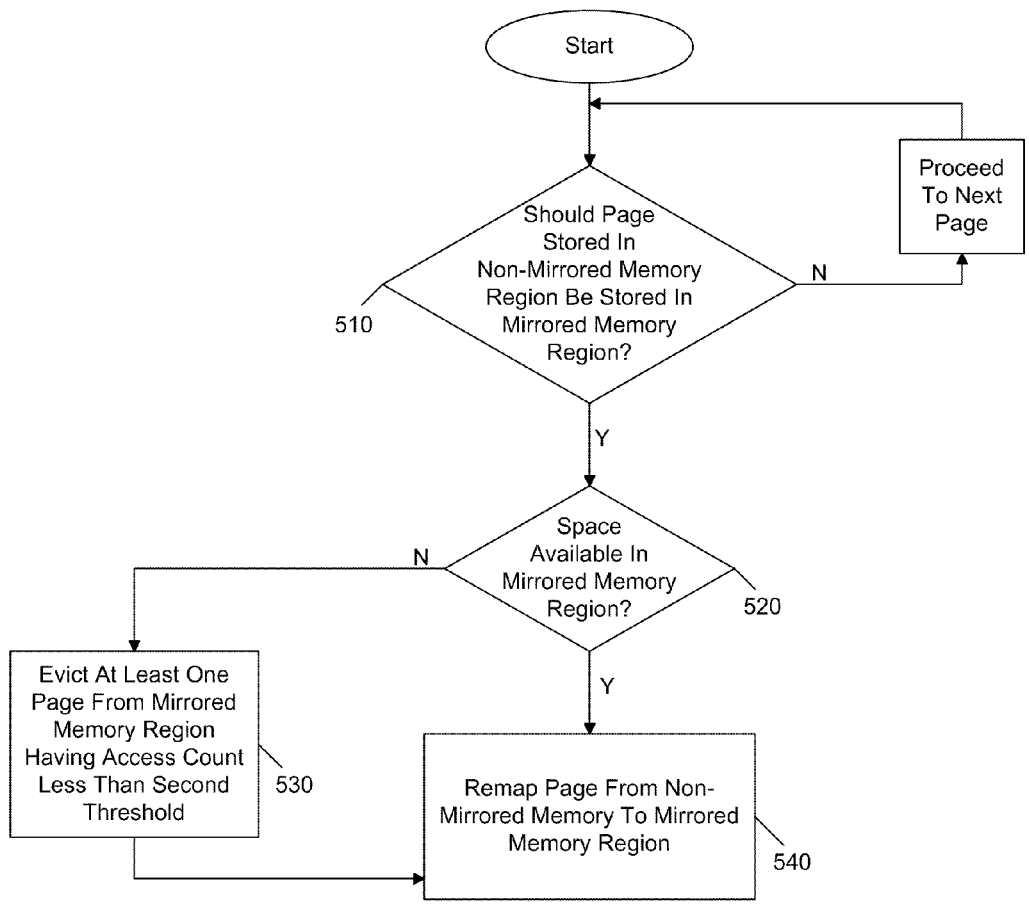
FIG. 5 is a flow diagram of a high level method of dynamically remapping data to a mirrored memory region in accordance with an embodiment of the present invention.

Referring now to FIG. 5, shown is a flow diagram of a high level method of determining whether to dynamically remap data to a mirrored memory region in accordance with an embodiment of the present invention. As shown in FIG. 5, method 500, which may be implemented within an OS or other supervisor software, may determine whether a given page that is stored in a non-mirrored memory region should be stored in a mirrored memory region (diamond 510). This determination may take various forms, as described below. Note in some embodiments method 500 may be iteratively performed for each page that is accessed in a given time interval. While the scope of the present invention is not limited in this regard, in some embodiments this interval may be between approximately 1-10 ms, which is a sampling interval to check the state of an access indicator and update page access counts. During that time interval, this access indicator, e.g., an access bit of a page table entry for the page, may be updated if the page is accessed. In general, each page table entry may further include an access count, which may be an accumulation of the number of times the access indicator was accessed. Note that this count may be epoch-based. That is, there can be many sampling intervals within an epoch and the access count will be reset at the start of each epoch. The actual migration between mirrored and non-mirrored can be performed at the start of each such epoch. Further, the OS/VMM can dynamically adjust both the sampling interval as well as the time duration of an epoch in order to balance overhead associated with the migration. In one embodiment, excessive migration between mirrored and non-mirrored regions may prompt the OS/VMM to increase the sampling frequency and/or lengthen the epoch. If a given page should not be migrated, control passes to block 515 where the analysis may be performed for a next accessed page.

Still referring to FIG. 5, if it is determined that the page should be stored in a mirrored memory region, control passes to diamond 520, where it may be determined whether there is available space in the mirrored memory region. If not, control passes to block 530, where at least one page from the mirrored memory region that has an access count lower than a second threshold may be evicted. This second thread may be a low threshold mark, described above. Control then passes to block 540 where the desired page may be re-mapped from a non-mirrored region to a mirrored memory region.

Figure 6:
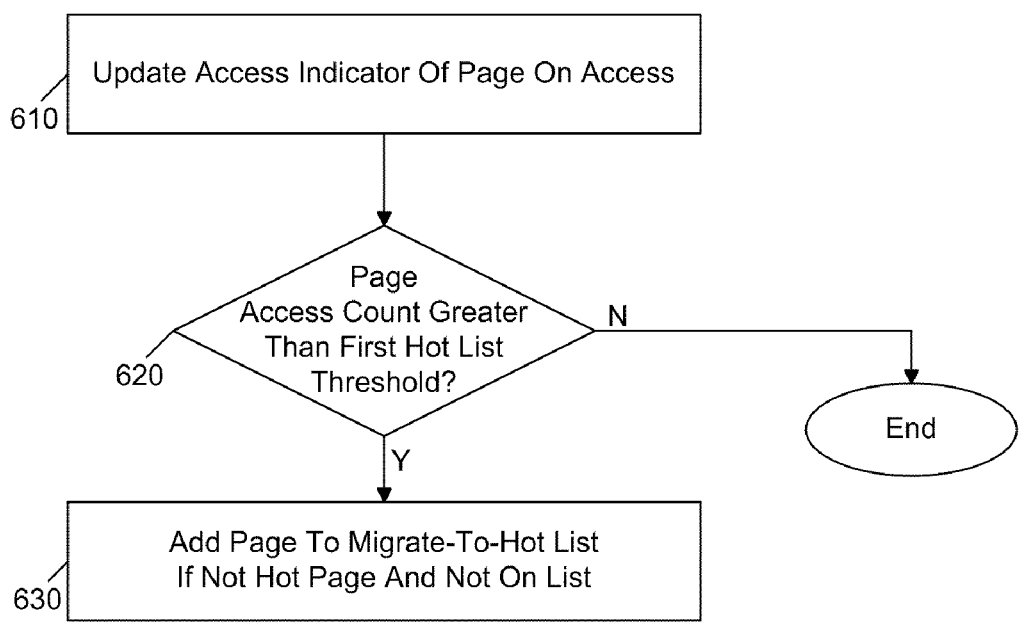
FIG. 6 is a flow diagram of an example method for selecting a page for insertion into a mirrored memory region in accordance with one embodiment of the present invention.

As discussed above, different implementations for determining whether a given memory page should be remapped to a mirrored memory region are possible. Referring now to FIG. 6, shown is a flow diagram of an example method for selecting a page for insertion into a mirrored memory region. As seen, method 600, which again may be performed by an OS or other supervisor software may begin by updating an access indicator of a page on an access (block 610). In addition, an access count for the page may also be updated (e.g., incremented) to set forth the number of accesses to the page. Then it may be determined whether the access count for the page is greater than a first hot list threshold (diamond 620). This first threshold may be the high threshold mark, which can be used as a proxy for determining that a page should be migrated to a mirrored region. If the given page has an access count greater than this threshold control passes to block 630, where the page may be added to a migrate-to-hot list (if the page is not already present in this list and is not present in the list of pages (i.e., a hot list) present in the mirrored memory region). If instead at diamond 620 the determination is in the negative, method 600 may conclude.

Figure 7:
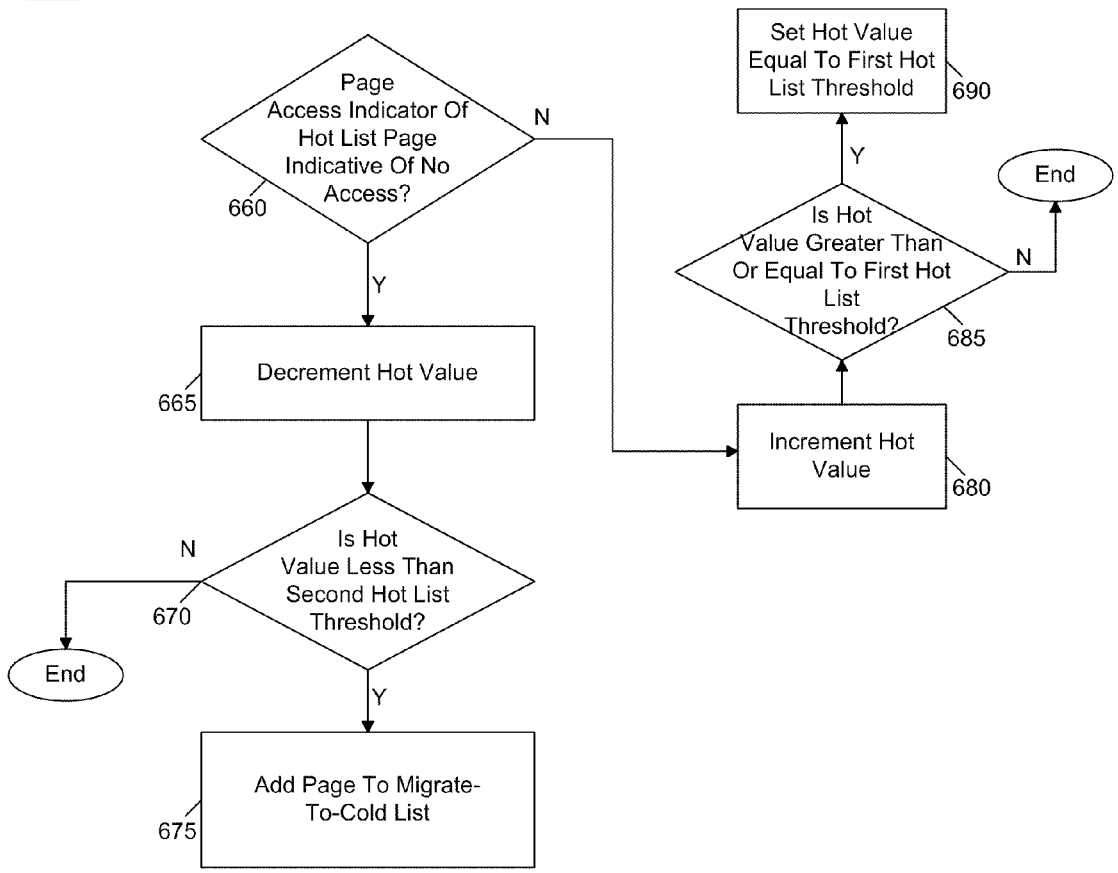
FIG. 7 is a flow diagram of a method for performing migration of a page in accordance with one embodiment of the present invention.

Referring now to FIG. 7, shown is a method for determining whether a page present in a mirrored memory region should be migrated to a non-mirrored memory region. As seen, method 650 may begin by determining whether a page access indicator of a page present in the mirrored memory region (and is thus present on a hot-list) is indicative of no access. That is, it may be determined whether this page in the mirrored memory region has not been accessed during a given time interval. If the page has not been accessed, a hot value, which may correspond to a minimum level at which a page is considered to be hot (and thus should be in the mirrored memory region), may be decremented (block 665). Control then passes to diamond 670 where it may be determined whether this hot value is less than a second hot list threshold. This second hot list threshold may be a low threshold below which a page should be removed from the mirrored memory region. If so, control passes to block 675 where the page may be added to a migrate-to-cold list, otherwise the method may conclude as to this page. This list may be a list of pages currently stored in the mirrored memory region that should instead be stored in a non-mirrored memory region.

Still referring to FIG. 7, if instead the determination of diamond 660 indicates that the page has been accessed, control passes to block 680, where a hot value for the page may be incremented. Control then passes to diamond 685 where it may be determined whether the hot value is greater than the first hot list threshold level which, as discussed above may be the high level threshold. If so, the memory page may have its access count set to the hot value (block 690), otherwise the method may conclude for this page. In this way, the hot value can be maintained between the high and low thresholds and to avoid a hysteresis effect.

Referring now to Table 1, shown is a pseudo code of migration analyzer in accordance with one embodiment of the present invention in one implementation, an OS thread may be used for the analyzer. In general, the migration analyzer may execute as set forth in FIGS. 6 and 7.

TABLE 1

For each page with accessed bit == 1
    Increment page.Acount
    if page.Acount > Hot-list-high-threshold AND
        page not present in Hot-list AND
        page not present in migrate-to-hot list
            Add page to migrate-to-hot list
    endif
endfor
For each pageH in Hot-list
    If pageH.accessBit == 0
        Decrement pageH.HotLife
        if pageH.HotLife < Hot-list-low-threshold TABLE 1-continued

```
            Add page to migrate-to-cold list
        endif
    else
        Increment pageH.HotLife
        if pageH.HotLife > Hot-list-high-threshold
            pageH.HotLife = Hot-list-tdgh-Threshold
        endif
    endif
endfor
Clear all page.accessBits
```

Figure 8:
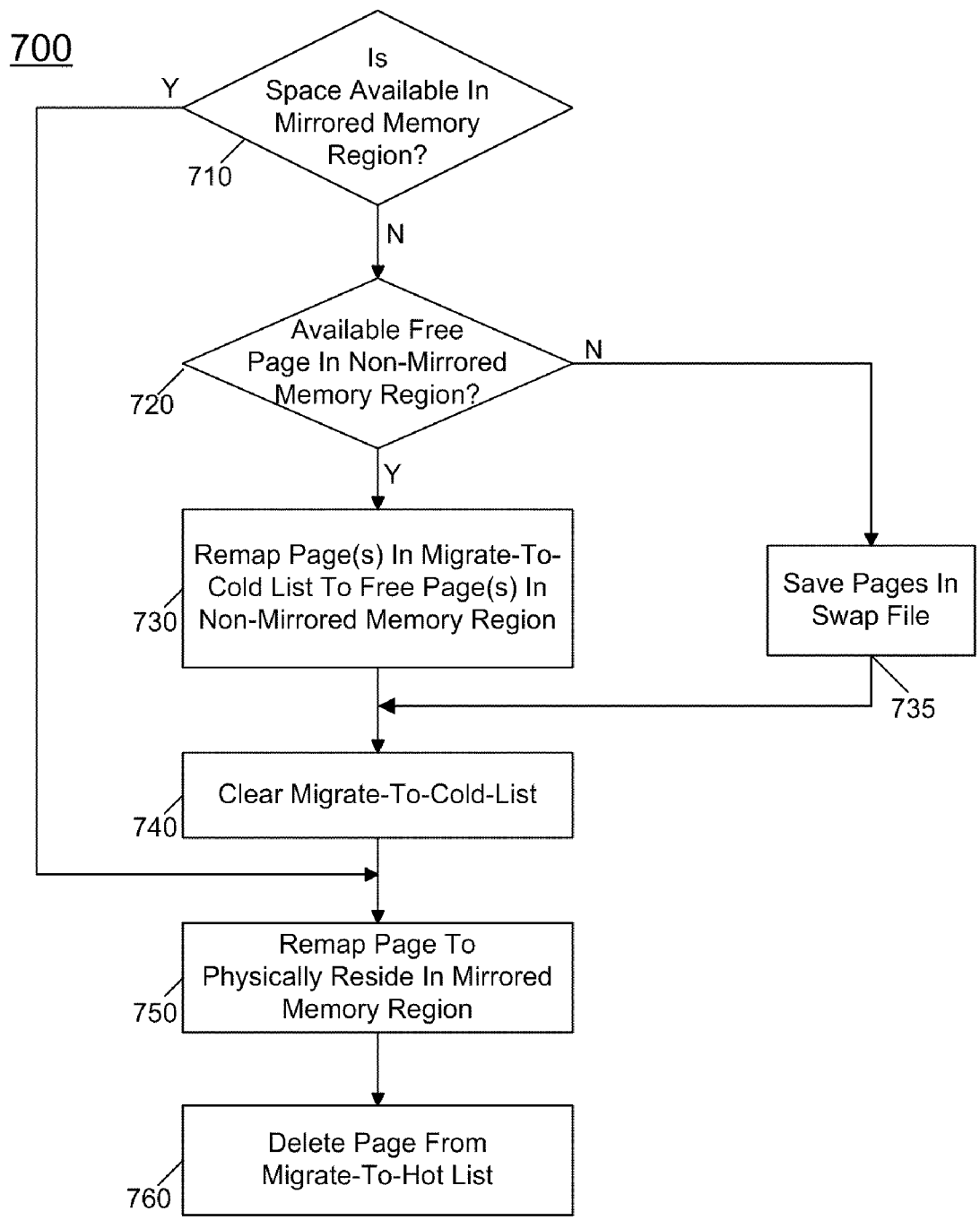
FIG. 8 is a flow diagram of a remap operation in accordance with one embodiment of the present invention.

Referring now to FIG. 8, shown is a flow diagram of a remap operation in accordance with one particular embodiment of the present invention. As shown in FIG. 8, method 700 may be performed to dynamically remap values, e.g., based on information in various lists or tables accessible to the OS, e.g., a migrate-to-hot list and a migrate-to-cold list. As seen in FIG. 8, method 700 may begin by determining whether there is space available in a mirrored memory region (diamond 710). If so, the migration may proceed at block 750, described below. If not, control passes to diamond 720 where it may be determined if there is available space in a non-mirrored memory region. If so, control passes to block 730 where one or more pages from the migrate-to-cold list may be remapped to free pages in the non-mirrored memory region. Otherwise if at diamond 720 it is determined that no available free pages are present, instead the one or more pages may be stored in a swap file (block 735). In one embodiment, this swap file may be stored in a secondary storage such as a hard disk or solid state disk.

As seen in FIG. 8, from both of blocks 730 and 735, control passes to block 740 where the migrate-to-cold list may be cleared (in a situation where all cold pages have been migrated to a non-mirrored memory region). Thus after this time, there may be space available in the mirrored memory region. Accordingly, at block 750 one or more pages that are present in the migrate-to-hot list may be remapped to a mirrored memory region, i.e., an available memory page of the mirrored memory region. Control then passes to block 760, where the one or more pages may be removed from the migrate-to-hot list. While shown with this particular implementation in the embodiment of FIG. 8, the scope of the present invention is not limited in this regard.

Referring now to Table 2, shown is a pseudo code of a remapper in accordance with one embodiment of the present invention. In one implementation, an OS thread may be used for the remapper. In general, the remapper may execute in accordance with the flow diagram of FIG. 8.

TABLE 2

```
For each pageH in migrate-to-hot-list
    if space NOT available in mirrored memory region AND
        migrate-to-cold list is not-empty
            for each pageC in migrate-to-cold-list
                if available free page in non-mirrored memory region
                    remap pageC to non-mirrored region
                else
                    save pageC to page-swap-area (i.e. swap file)
            endfor
            Clear migrate-to-cold list
    endif
    if space available in mirrored memory region
        Remap pageH so that it physically resides in mirrored region
        Delete pageH from migrate-to-hot list
    endif
endfor
```

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An article comprising a machine-accessible storage medium including instructions that when executed cause a system to:
    determine that a first memory page stored in a non-mirrored memory region of memory has been accessed more than a first threshold number of times during a first time period;
    insert an identifier for the first memory page in a list of pages to be migrated to a mirrored memory region; and
    remap the first memory page from the non-mirrored memory region to the mirrored memory region.

2. The article of claim 1, further comprising instructions that enable the system to first remap a second memory page from the mirrored memory region to the non-mirrored memory region before remapping the first memory page to the mirrored memory region.

3. The article of claim 2, wherein the second memory page is less frequently accessed than the first memory page during the first time period.

4. The article of claim 1, further comprising instructions that enable the system to first remap a second memory page from the mirrored memory region to the non-mirrored memory region before remapping the first memory page to the mirrored memory region if an identifier for the second memory page is within a list of pages to be migrated from the mirrored memory region.

5. The article of claim 4, further comprising instructions that enable the system to insert the second memory page identifier in the list of pages to be migrated from the mirrored memory region when the second memory page has been accessed less than a second threshold number of times during the first time period.

6. The article of claim 1, further comprising instructions that enable the system to maintain a count of a number of times the first memory page has been accessed during the first time period.

7. The article of claim 6, further comprising instructions that enable the system to update the count for the first memory page when an access indicator for the first memory page is set.

8. The article of claim 1, further comprising instructions that enable the system to use an operating system (OS) thread to insert the identifier for the first memory page and to remap the first memory page.

9. The article of claim 1, further comprising instructions that enable the system to:
- maintain a first list having a plurality of entries each to store an identifier for a corresponding memory page stored in the mirrored memory region; and
- maintain a second list having a plurality of entries each to store an identifier for a corresponding memory page stored in the non-mirrored memory region.

10. The article of claim 9, further comprising instructions that enable the system to update each entry of the first list at an end of the first time period based on a state of an access indicator of the corresponding memory page.

11. A system comprising:
- a plurality of processors, each of the plurality of processors coupled to at least one other of the processors and further coupled to a portion of a system memory locally coupled to the corresponding processor; and
- the system memory coupled to the plurality of processors and in a partially mirrored configuration in which a first portion of the system memory coupled to a first processor is to be partially mirrored with a second portion of the system memory coupled to a second processor, wherein the system memory includes instructions to enable the system to determine that a first memory page stored in a non-mirrored memory region is a hot page and to dynamically remap the first memory page from the non-mirrored memory region to the first portion.

12. The system of claim 1, further comprising instructions that enable the system to insert an identifier for the first memory page in a list of pages to be migrated to the first portion.

13. The system of claim 1, further comprising instructions that enable the system to first remap a second memory page from the first portion to the non-mirrored memory region before remapping the first memory page to the first portion, wherein the second memory page is less frequently accessed than the first memory page during a first time period.

14. The system of claim 13, further comprising instructions that enable the system to update a count of a number of times the first memory page has been accessed when an access indicator for the first memory page is set.

15. A method comprising:
- determining that a first memory page stored in a non-mirrored memory region of a first local memory coupled to a first processor has been accessed more than a first threshold number of times during a first time period, the first local memory corresponding to a dynamic random access memory (DRAM) including at least one memory module for the non-mirrored memory region and at least one memory module for the mirrored memory region;
- inserting an identifier for the first memory page in a list of pages to be migrated to a mirrored memory region of the first local memory; and
- remapping the first memory page from the non-mirrored memory region to the mirrored memory region of the first local memory.

16. The method of claim 15, further comprising first remapping a second memory page from the mirrored memory region to the non-mirrored memory region before remapping the first memory page to the mirrored memory region.

17. The method of claim 15, further comprising first remapping a second memory page from the mirrored memory region to the non-mirrored memory region before remapping the first memory page to the mirrored memory region if an identifier for the second memory page is within a list of pages to be migrated from the mirrored memory region.

18. The article of claim 17, further comprising inserting the second memory page identifier in the list of pages to be migrated from the mirrored memory region when the second memory page has been accessed less than a second threshold number of times during the first time period, the second threshold number of times less than the first threshold number of times.

19. The method of claim 15, further comprising maintaining a count of a number of times the first memory page has been accessed during the first time period in a page table entry for the first memory page.

20. The method of claim 19, further comprising updating the count for the first memory page when an access indicator of the page table entry for the first memory page is set.

21. The method of claim 15, further comprising maintaining a first list having a plurality of entries each to store an identifier for a corresponding memory page stored in the mirrored memory region, and maintaining a second list having a plurality of entries each to store an identifier for a corresponding memory page stored in the non-mirrored memory region.

* * * * *

UNITED STATES PATENT AND TRADEMARK OFFICE
CERTIFICATE OF CORRECTION

PATENT NO. : 8,407,516 B2  
APPLICATION NO. : 12/645778  
DATED : March 26, 2013  
INVENTOR(S) : Robert C. Swanson et al.

Page 1 of 1

It is certified that error appears in the above-identified patent and that said Letters Patent is hereby corrected as shown below:

In the Claims:

Column 11:  
Line 28, "claim 1" should be --claim 11--

Column 11:  
Line 32, "claim 1" should be --claim 11--

Signed and Sealed this  
Eighteenth Day of June, 2013

Teresa Stanek Rea  
*Acting Director of the United States Patent and Trademark Office*